United States Patent
Lee (10) Patent No.: US 9,167,673 B2
(45) Date of Patent: Oct. 20, 2015

(54) METHOD FOR CONTROLLING A PLURALITY OF STREET LAMPS

(71) Applicant: SAMSUNG ELECTRONICS CO., LTD., Gyeonggi-do (KR)

(72) Inventor: Sang-Gon Lee, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 385 days.

(21) Appl. No.: 13/692,434

(22) Filed: Dec. 3, 2012

(65) Prior Publication Data

US 2013/0140992 A1    Jun. 6, 2013

(30) Foreign Application Priority Data

Dec. 2, 2011  (KR) .................. 10-2011-0128527

(51) Int. Cl.
*G08B 21/00*   (2006.01)
*H05B 37/03*   (2006.01)

(52) U.S. Cl.
CPC .............. *H05B 37/03* (2013.01); *H05B 37/034* (2013.01); *Y02B 20/72* (2013.01)

(58) Field of Classification Search
CPC ............... H05B 37/03; H05B 37/0227; H05B 37/0254; H05B 37/0281
USPC ............... 340/540, 641, 539.1; 315/297, 312, 315/129, 132, 158, 152, 153; 702/58, 188
See application file for complete search history.

(56) References Cited

U.S. PATENT DOCUMENTS

| 8,140,276 B2* | 3/2012 | Walters et al. ................. 702/58 |
| 2007/0109142 A1* | 5/2007 | McCollough, Jr. ........... 340/641 |
| 2009/0066258 A1* | 3/2009 | Cleland et al. ................ 315/158 |
| 2011/0053492 A1* | 3/2011 | Hochstein .......................... 455/7 |

FOREIGN PATENT DOCUMENTS

| JP | 2002-324142 A | 11/2002 |
| JP | 2011-029053 A | 2/2011 |
| KR | 10-2003-0019936 A | 3/2003 |
| KR | 10-0712410 B1 | 4/2007 |
| KR | 2007-0073193 A | 7/2007 |
| KR | 10-0813132 B1 | 3/2008 |
| KR | 2011-0011411 A | 2/2011 |

* cited by examiner

*Primary Examiner* — Toan N Pham
(74) *Attorney, Agent, or Firm* — McDermott Will & Emery LLP (57) ABSTRACT

A method of controlling multiple street lamps with a mobile terminal includes receiving event information regarding a street lamp, among the multiple street lamps, from a gateway via an Internet in real-time. The event information indicates that a predetermined event has occurred in the street lamp. Notification information indicating that the event information has been received, is provided to a user of the mobile terminal in real-time. A control instruction for controlling the first street lamp based on control information input by the user, is transmitted to the first street lamp.

17 Claims, 9 Drawing Sheets

METHOD FOR CONTROLLING A PLURALITY OF STREET LAMPS

CROSS-REFERENCE TO RELATED APPLICATIONS

This U.S. non-provisional application claims the benefit of priority to Korean Patent Application No. 10-2011-0128527, filed on Dec. 2, 2011, in the Korean Intellectual Property Office, the entire contents of which are hereby incorporated by reference.

TECHNICAL FIELD

The present disclosure relates to method and apparatus for controlling a plurality of street lamps.

BACKGROUND

Generally, a code division multiple access (CDMA) technology at a particular frequency, or power line communication (PLC) technologies may be used in controlling a plurality of street lamps.

SUMMARY

According to an aspect of the present disclosure, a method of controlling a plurality of street lamps with a mobile terminal, includes steps of: receiving event information regarding a first street lamp in which a predetermined event has occurred, among the plurality of street lamps, from a gateway connected to the plurality of street lamps via an Internet in real-time. Notification information indicating that the event information has been received, is provided to a user of the mobile terminal in real-time. A control instruction for controlling the first street lamp based on control information input by the user, is transmitted to the first street lamp.

According to another aspect of the present disclosure, a method of controlling a plurality of street lamps by using a gateway, includes steps of: monitoring whether a predetermined event occurs in the plurality of street lamps. It is determined according to a monitoring result, whether a predetermined event has occurred in a first street lamp among the plurality of street lamps. When it is determined that the pre-determine event has occurred in the first street lamp, event information indicating that the predetermined event has occurred in the first street lamp is generated. The generated event information is transmitted to a mobile terminal connected to the gateway via an Internet in real-time.

According to another aspect of the present disclosure, there is provided a non-transitory computer readable recording medium having recorded thereon a program for executing methods of controlling a plurality of street lamps.

According to another aspect of the present disclosure, an apparatus for controlling a plurality of street lamps, includes a mobile terminal and a gateway, which is connected to the plurality of street lamps. The gate way is configured to monitor whether a predetermined event occurs in the plurality of street lamps, generate event information indicating that the predetermined event occurred in a first street lamp among the plurality of street lamps, and transmit the generated event information to the mobile terminal. The mobile terminal includes a communication interface and a user interface. The communication interface unit receives the event information from the gateway via an Internet in real-time. The user interface unit provides notification information indicating that the event information has been received, to a user in real-time. The communication interface unit transmits, to the first street lamp, a control instruction for controlling the first street lamp based on control information input by the user.

BRIEF DESCRIPTION OF THE DRAWINGS

The foregoing and other features of the present disclosure will be apparent from more particular description of examples of the present disclosure, as illustrated in the accompanying drawings in which like reference characters may refer to the same or similar parts throughout the different views. The drawings are not necessarily to scale, emphasis instead being placed upon illustrating the principles of the examples of the present disclosure.

DETAILED DESCRIPTION

Examples of the present disclosure will be described below in more detail with reference to the accompanying drawings. The examples of the present disclosure may, however, be embodied in different forms and should not be construed as limited to the examples set forth herein. Like reference numerals may refer to like elements throughout the specification.

Hereinafter, referring to the drawings, the examples of the present disclosure will be described in further detail.

Figure 1:
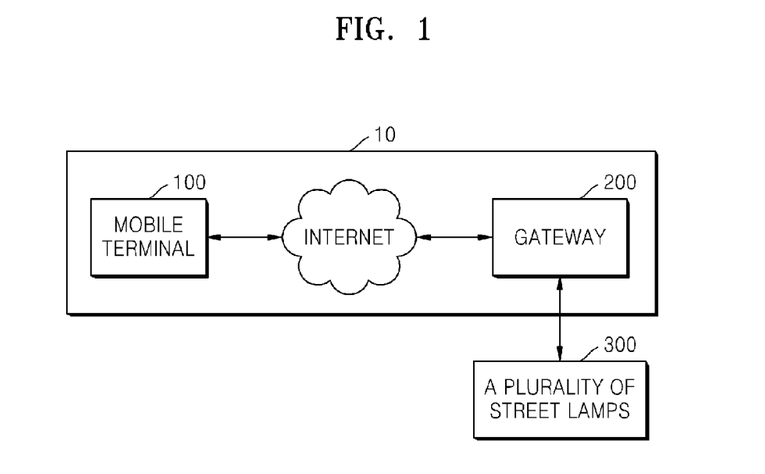
FIG. 1 illustrates a structure of a system for controlling a plurality of street lamps, according to an example of the present disclosure.

FIG. 1 illustrates a structure of a system 10 for controlling a plurality of street lamps, according to an example of the present disclosure. Referring to FIG. 1, the system 10 for controlling a plurality of street lamps may include a mobile terminal 100 and a gateway 200.

The system 10 for controlling a plurality of street lamps illustrated in FIG. 1 includes only elements relating to an example of the present disclosure. Thus, it will be understood that general elements other than the elements illustrated in FIG. 1 may be further included in the system 10 for controlling a plurality of street lamps.

The system 10 for controlling a plurality of street lamps may control a plurality of street lamps 300 by using the mobile terminal 100 and the gateway 200.

A user may control the plurality of street lamps 300 by manipulating the mobile terminal 100. For example, the mobile terminal 100 may be an electronic device that may be carried by the user, such as a cellular phone, a smart phone, a personal digital asset (PDA), a netbook, a notebook, portable device, or the like.

More specifically, the user may input control information for controlling the plurality of street lamps 300 by using the mobile terminal 100, or may view information regarding statuses of the plurality of street lamps 300 by using the mobile terminal 100. In this case, the control information input to the mobile terminal 100 may be transmitted to the plurality of street lamps 300 via the gateway 200. The status information that may be viewed by the mobile terminal 100 may be received by the mobile terminal 100 via the gateway 200.

The gateway 200 may relay data transmission and reception between the mobile terminal 100 and the plurality of street lamps 300. For example, the gateway 200 may include a plurality of sub-gateways and a main gateway for managing the plurality of sub-gateways. In this case, the plurality of sub-gateways may be connected to the plurality of street lamps 300, and the main gateway may be connected to the mobile terminal 100. However, aspects of the present disclosure are not limited thereto.

In this regard, the mobile terminal 100 and the gateway 200 may communicate with each other via the wired/wireless Internet by using a communication module disposed in each of the mobile terminal 100 and the gateway 200. However, aspects of the present disclosure are not limited thereto. In this way, as communication between the mobile terminal 100 and the gateway 200 is performed based on the Internet, the mobile terminal 100 and the gateway 200 may transmit and receive data to and from each other in real-time. Communication to be performed based on the Internet according to the present disclosure may refer to communication to be performed via an Internet network.

In addition, the gateway 200 and the plurality of street lamps 300 may communicate with each other by using a wired/wireless network, wired serial communication, or the like. However, aspects of the present disclosure are not limited thereto. For example, the network may include the Internet, a local area network (LAN), a wireless local area network (wireless LAN), a wide area network (WAN), a personal area network (PAN), or the like. However, aspects of the present disclosure are not limited thereto, and another type of network via which information may be transmitted/received may also be used. Additionally, network communication between the gateway 200 and the plurality of street lamps 300 may be performed based on a power line for supplying power to each of the plurality of street lamps 300.

As described above, since the system 100 for controlling a plurality of street lamps may control the plurality of street lamps 300 by using the mobile terminal 100 and the gateway 200, the user may manage and control the plurality of street lamps 200 conveniently.

Figure 2:
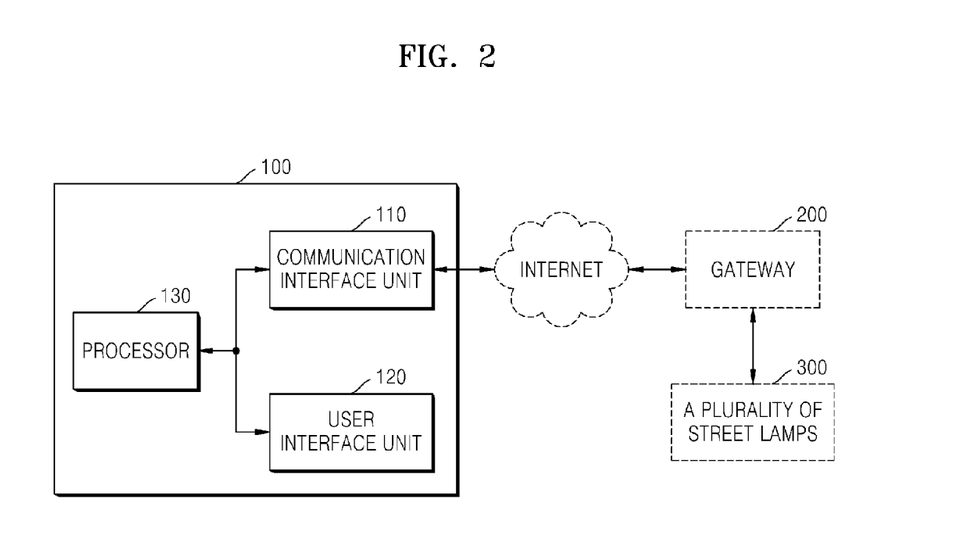
FIG. 2 illustrates a structure of a mobile terminal illustrated in FIG. 1, according to an example of the present disclosure.

FIG. 2 illustrates a structure of the mobile terminal 100 illustrated in FIG. 1, according to an example of the present disclosure. Referring to FIG. 2, the mobile terminal 100 may include a communication interface unit 110, a user interface unit 120, and a processor 130.

The mobile terminal 100 illustrated in FIG. 2 includes only elements relating to an example of the present disclosure. Thus, it will be understood that general elements other than the elements illustrated in FIG. 2 may be further included in the mobile terminal 100.

In addition, the mobile terminal 100 shown in FIG. 2 is an example of the mobile terminal 100 illustrated in FIG. 1. Thus, the mobile terminal 100 according to an example of the present disclosure is not limited to the elements illustrated in FIG. 2. In addition, the description of FIG. 1 may be applied to the mobile terminal 100 shown in FIG. 2 and thus, any redundant description thereof will be omitted.

The user may control the plurality of street lamps 300 by using the mobile terminal 100.

The communication interface unit 110 may receive event information regarding a first street lamp in which a predetermined event occurs, among the plurality of street lamps 300, from the gateway 200 connected to the plurality of street lamps 300 via the Internet in real-time. For example, the predetermined event may include a case where a street lamp is out of order or occurrence of the malfunction; however, the aspects of the present disclosure are not limited thereto.

Thus, the event information regarding the first street lamp received from the communication interface unit 110 may include information regarding the position of the first street lamp and information regarding a malfunction that occurs in the first street lamp. For example, the information regarding the position of the first street lamp may be an address of the first street lamp, and the information regarding the malfunction that occurs in the first street lamp may be error codes configured according to a protocol.

In this case, various error codes may have different types according to malfunctions that may occur in the first street lamp by settings of the mobile terminal 100, the gateway 200, and the plurality of street lamps 300. For example, the malfunctions that may occur in the first street lamp may include malfunctions a power supply, a controller, a wired/wireless connection, or the like. In this case, the error codes may be set differently according to types of a malfunction.

In addition, the communication interface unit 110 according to an example of the present disclosure is connected to the gateway 200 via the Internet and thus may receive the event information regarding the first street lamp from the gateway 200 in real-time. In this case, real-time reception means that the communication interface unit 110 receives the event information from the gateway 200 simultaneously when a predetermined event occurs in the first street lamp, or within a predetermined time after the predetermined event occurs in the first street lamp. In this case, the predetermined time may vary according to a connection status of the Internet but may be less than several seconds, and aspects of the present disclosure are not limited thereto.

Thus, the communication interface unit 110 may receive the event information from the gateway 200 via a wireless-fidelity (Wi-Fi) network in real-time. However, aspects of the present disclosure are not limited thereto, and the communication interface unit 110 may receive the event information from the gateway 200 via a mobile communication network, such as a third generation (3G) network, a long term evolution (LTE) network, a fourth generation (4G) network, or the like in real-time.

In more detail with reference to real-time reception, the mobile terminal 100 may perform two-way communication with the gateway 200 so as to receive the event information by using the communication interface unit 110 in real-time.

For example, the mobile terminal 100 may receive the event information from the gateway 200 by using a broadcasting message in real-time. That is, the mobile terminal 100 may transmit data that is preset by the communication interface unit 110, to the gateway 200 at regular intervals and may receive the event information from the gateway 200 in real-time by analyzing data regarding a return value received from the gateway 200. For example, as a result of analyzing the data regarding the return value received from the gateway 200, error data corresponding to error codes may be included in a protocol. In this case, the return value data received from the gateway 200 may be analyzed by the processor 130. However, aspects of the present disclosure are not limited thereto, and the return value data received from the gateway 200 may be analyzed by the communication interface unit 110. In this case, the mobile terminal 100 may receive the event information from the gateway 200 by using a push-up service provided by a broadcast receiver function in real-time.

For example, the mobile terminal 100 may be set to be woken up when receiving the preset data. That is, when the mobile terminal 100 is turned on, the mobile terminal 100 is set to be woken up when receiving the preset data. Thus, the mobile terminal 100 is woken up when receiving data having the same type as that of the event information from the gateway 200 so that the mobile terminal 100 may receive the event information in real-time. In this case, the setting operation, whereby the mobile terminal 100 is woken up when receiving the preset data, may be performed by an application installed at the mobile terminal 100.

In this way, the mobile terminal 100 may receive the event information from the gateway 200 by using various methods in real-time.

The user interface unit 120 may provide notification information indicating that the event information was received by the communication interface unit 110, to a user of the mobile terminal 100 in real-time. For example, the user interface unit 120 includes input/output devices, such as a display panel, a mouse, a keyboard, a touch screen, a monitor, a speaker, and the like, which are disposed on the mobile terminal 100, and software modules for driving the input/output devices.

The user interface unit 120 according to an example of the present disclosure may provide the notification information in real-time by performing at least one of a display operation of displaying the notification information and a sound outputting operation of outputting a sound corresponding to the notification information, by using a push function.

In this case, the push function refers to, when a preset condition is satisfied, automatically providing information indicating that the condition was satisfied. For example, the preset condition may be reception of the event information.

When the event information is received via the communication interface unit 110, the mobile terminal 100 according to an example of the present disclosure may automatically provide the notification information indicating that the event information was received by the user, by using the user interface unit 120.

The user interface unit 120 may perform at least one of the display operation of displaying the notification information and the sound outputting operation of outputting a sound corresponding to the notification information.

In performing the display operation, the user interface unit 120 may display a phrase, such as "first street lamp was out of order," "third street lamp out of order," or "third street lamp in first area out of order." However, aspects of the present disclosure are not limited thereto, and the user interface unit 120 may display a message preset by the user. This will be described in more detail with reference to FIG. 5.

In addition, in more detail with reference to the sound outputting operation, the user interface unit 120 may reproduce a phrase, such as "occurrence of malfunction of first street lamp," in voice form. However, aspects of the present disclosure are not limited thereto, and the user interface unit 120 may output a sound from a sound source, such as a buzzer, an alarm, or the like, which is preset by the user.

Thus, the user of the mobile terminal 100 may check whether a predetermined event occurs in a specific street lamp, e.g., in the first street lamp, in real-time by referring to the notification information provided using the user interface unit 120 in real-time. In this case, the user may input control information for controlling the first street lamp to the first user interface 120. This will be described in more detail with reference to FIG. 6.

In addition, the communication interface unit 110 may transmit, to the first street lamp, a control instruction for controlling the first street lamp based on the control information input by the user. Thus, the control instruction transmitted from the communication interface unit 110 to the first street lamp via the gateway 200 is used in controlling the first street lamp by using a unit controller of the first street lamp.

For example, the control instruction may be an instruction for performing at least one of an operation of diagnosing the first street lamp, an operation of turning on/off the first street lamp, an operation of dimming the first street lamp, and an operation of resetting the first street lamp in a preset initial state. However, aspects of the present disclosure are not limited thereto.

In this case, the operation of diagnosing the first street lamp may be an operation of checking whether the first street lamp operates normally and may include, for example, at least one of an operation of diagnosing a power supply device of the first street lamp, an operation of diagnosing a controller of the first street lamp, and an operation of diagnosing a wired/wireless connection status of the first street lamp. However, aspects of the present disclosure are not limited thereto.

In this case, the operation of diagnosing the power supply device of the first street lamp may be an operation of checking whether the power supply device of the first street lamp operates normally, and the operation of diagnosing the controller of the first street lamp may be an operation of checking whether the controller of the first street lamp operates normally, and the operation of diagnosing the wired/wireless connection status of the first street lamp may be an operation of checking whether the wired/wireless connection status of the first street lamp is in good order.

In addition, the operation of turning on/off the first street lamp may be an operation of powering on/off the first street lamp, and the operation of dimming the first street lamp may be an operation of controlling illumination of the first street lamp, and the operation of resetting the first street lamp in the present initial state may be an operation of resetting setting values of the first street lamp in an initial state and then powering on the first street lamp.

In addition, aspects of the present disclosure are not limited thereto, and the user may perform various control operations of the first street lamp by using the mobile terminal 100. Thus, the user may control the street lamp among the plurality of street lamps 300, in which a predetermined event, such as a malfunction, occurs, easily and conveniently by using the mobile terminal 100.

Additionally, the user may view information regarding positions and statuses of the plurality of street lamps 300 by using the mobile terminal 100.

For example, the user interface unit 120 may display a map to which information regarding the position of at least one street lamp among the plurality of street lamps 300 is mapped, according to user's manipulation. In this case, the user interface unit 120 may map the information regarding the position of at least one street lamp among the plurality of street lamps 300 to a map embedded in the mobile terminal 100 or a map provided via the Internet. In this case, the map provided via the Internet may be a map provided by an Internet service provider, such as Google, Naver, Yahoo, or the like.

In addition, the user may select an area whose state information is to be viewed, from among a plurality of areas displayed on the map by using the user interface unit 120. In this case, the plurality of areas displayed on the map may correspond to a plurality of groups in which the plurality of street lamps 300 is grouped according to their positions. The user interface unit 120 may further display position information and status information of the area selected by the user, such as information on existence of an operation, a degree of dimming, and existence of a malfunction.

In addition, the user may select a street lamp whose status information is to be viewed, from among at least one street lamp displayed on the map by using the user interface unit 120. The user interface unit 120 may further display position information and status information of the street lamp selected by the user, such as information on existence of an operation, a degree of dimming, and existence of a malfunction. This will be described in detail with reference to FIGS. 7 through 9.

Thus, the user may easily view the position and current status of the first street lamp in which the predetermined event occurs, from among the plurality of street lamps 300.

The processor 130 may control general functions of the mobile terminal 100. For example, the processor 130 may execute an application received by the communication interface unit 110. That is, the communication interface unit 110 may receive the application for controlling the street lamp from an external device outside the mobile terminal 100, and the processor 130 may execute the received application. Thus, operations of controlling the plurality of street lamps 300 may be performed by the application executed by the processor 130 of the mobile terminal 100 according to an example of the present disclosure.

In this case, the external device outside the mobile terminal 100 may be a server device for storing various applications, or a storage device of a provider who provides the application for controlling the street lamp. However, aspects of the present disclosure are not limited thereto.

Thus, the user may recognize that the predetermined event has occurred in the first street lamp, by using the mobile terminal 100 in real-time. The user may control the first street lamp when the control information for checking whether the first street lamp is out of order, is input to the mobile terminal 100.

In addition, the mobile terminal 100 may receive control result information obtained by controlling the first street lamp from the gateway 200, and the received control result information may be displayed on the user interface unit 120.

Thus, the user may control the first street lamp by using the mobile terminal 100 and may view a control result in real-time.

Figure 3:
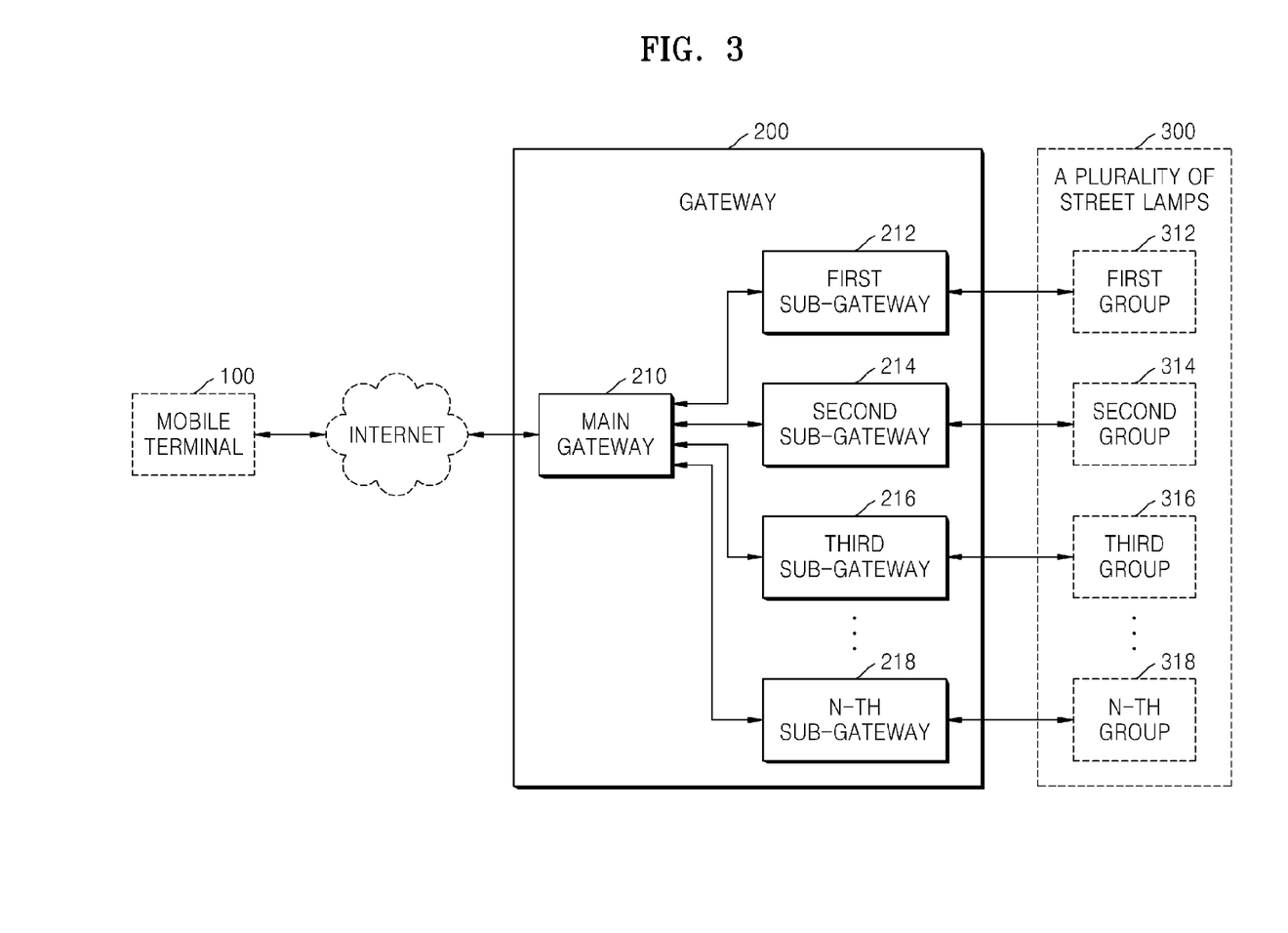
FIG. 3 illustrates a gateway illustrated in FIG. 1, according to an example of the present disclosure.

FIG. 3 illustrates the gateway 200 illustrated in FIG. 1, according to an example of the present disclosure. Referring to FIG. 3, the gateway 200 may include a main gateway 210, a first sub-gateway 212, a second sub-gateway 214, a third sub-gateway 216, . . . , and an N-th sub-gateway 218.

The gateway 200 illustrated in FIG. 3 may include any elements relating to an example of the present disclosure. Thus, it will be understood that general elements other than the elements illustrated in FIG. 2 may be further included in the gateway 200.

In addition, the gateway 200 shown in FIG. 3 is an example of the gateway 200 shown in FIG. 1. Thus, the gateway 200 according to an example of the present disclosure is not limited to the elements shown in FIG. 3. In addition, the description of FIG. 1 may be applied to the gateway 200 shown in FIG. 3 and thus, redundant descriptions thereof will be omitted.

The gateway 200 may relay data transmission and reception between the mobile terminal 100 and the plurality of street lamps 300, may collect information regarding the plurality of street lamps 300 in real-time and may inform the mobile terminal 100 of the collected information.

For example, the gateway 200 may monitor whether a predetermined event occurs in the plurality of street lamps 300, may generate information indicating that the predetermined event occurred in a first street lamp among the plurality of street lamps 300 and may transmit the generated information to the mobile terminal 100. In addition, the gateway 200 may transmit a control instruction output from the mobile terminal 100 to the first street lamp and may transmit, to the mobile terminal 100, a control result obtained by controlling the first street lamp based on the control instruction.

In this case, the plurality of sub-gateways 212, 214, 216, and 218 are connected to the main gateway 210. For example, the main gateway 210 and the plurality of sub-gateways 212, 214, 216, and 218 may be connected in a wired/wireless manner.

In this case, the gateway 200 may monitor the plurality of street lamps 300 by using the plurality of sub-gateways 212, 214, 216, and 218 for monitoring street lamps included in each of a plurality of groups of the plurality of street lamps 300. In this case, the plurality of groups of the plurality of street lamps 300 may be generated by grouping the plurality of street lamps 300 according to their positions.

In more detail, the plurality of street lamps 300 may be grouped into a plurality of groups, such as a first group 312, a second group 314, a third group 316, . . . , and an N-th group 318 according to their positions, and the plurality of sub-gateways 212, 214, 216, and 218 may monitor the street lamps included in each of the plurality of groups 312, 314, 316, . . . , and 318. More particularly, the plurality of sub-gateways 212, 214, 216, and 218 may monitor predetermined areas allocated to each of the sub-gateways 212, 214, 216, and 218, and may group the street lamps in the allocated predetermined areas into one group.

For example, the first sub-gateway 212 may monitor street lamps included in the first group 312, and the second sub-gateway 214 may monitor street lamps included in the second group 314, and the N-th sub-gateway 218 may monitor street lamps included in the N-th group 318.

For example, when a predetermined event occurred in the first street lamp included in the first group 312 among the plurality of street lamps 300, the first sub-gateway 212 for monitoring the first street lamp, among the plurality of sub-gateways 212, 214, 216, and 218, generates event information indicating that the predetermined event occurred in the first street lamp. In this case, the first sub-gateway 212 may receive information of a unit controller in each of the plurality of street lamps included in the first group 312 in real-time and may monitor the plurality of street lamps included in the first group 312 by analyzing the received information.

The first sub-gateway 212 generates event information including information regarding the position of the first street lamp and information regarding a malfunction that occurred in the first street lamp, depending on a monitoring result. For example, the information regarding the position of the first street lamp may be an address of the first street lamp, and the information regarding the malfunction that occurred in the first street lamp may be error codes configured as a protocol.

The first sub-gateway 212 may transmit the generated event information to the mobile terminal 100. In this case, the first sub-gateway 212 may transmit the generated event information to the main gateway 210 connected to the plurality of sub-gateways 212, 214, 216, and 218, and the main gateway 210 may transmit the event information transmitted from the first sub-gateway 212 to the mobile terminal 100. In this case, the main gateway 210 that transmits the event information to the mobile terminal 100 may re-interpret the event information generated by the first sub-gateway 212 and may transmit the re-interpreted event information to the mobile terminal 100.

In addition, a control instruction for controlling the first street lamp based on control information input to the mobile terminal 100 may be transmitted to the first sub-gateway 212 via the main gateway 210, and the first sub-gateway 212 may allow the control operation based on the control instruction to be performed on the first street lamp.

A result obtained by performing the control operation on the first street lamp may be transmitted to the mobile terminal 100 via the first sub-gateway 212 and the main gateway 210. Thus, the user of the mobile terminal 100 may view a result of performing the control operation based on the control instruction.

In addition, aspects of the present disclosure are not limited thereto. The mobile terminal 100 according to an example of the present disclosure may control the plurality of street lamps together, which are included in a group monitored by one among the plurality of sub-gateways 212, 214, 216, and 218. For example, the communication interface unit 110 may transmit a control instruction based on control information input by the user to a plurality of street lamps together, included in the second group 314 via the second sub-gateway 214, so as to control the plurality of street lamps included in the second group 314 monitored by the second sub-gateway 214 among the plurality of sub-gateways 212, 214, 216, and 218.

Thus, the gateway 200 according to an example of the present disclosure may control the plurality of street lamps 300 by using the main gateway 210 and the plurality of sub-gateways 212, 214, 216, and 218.

Figure 4:
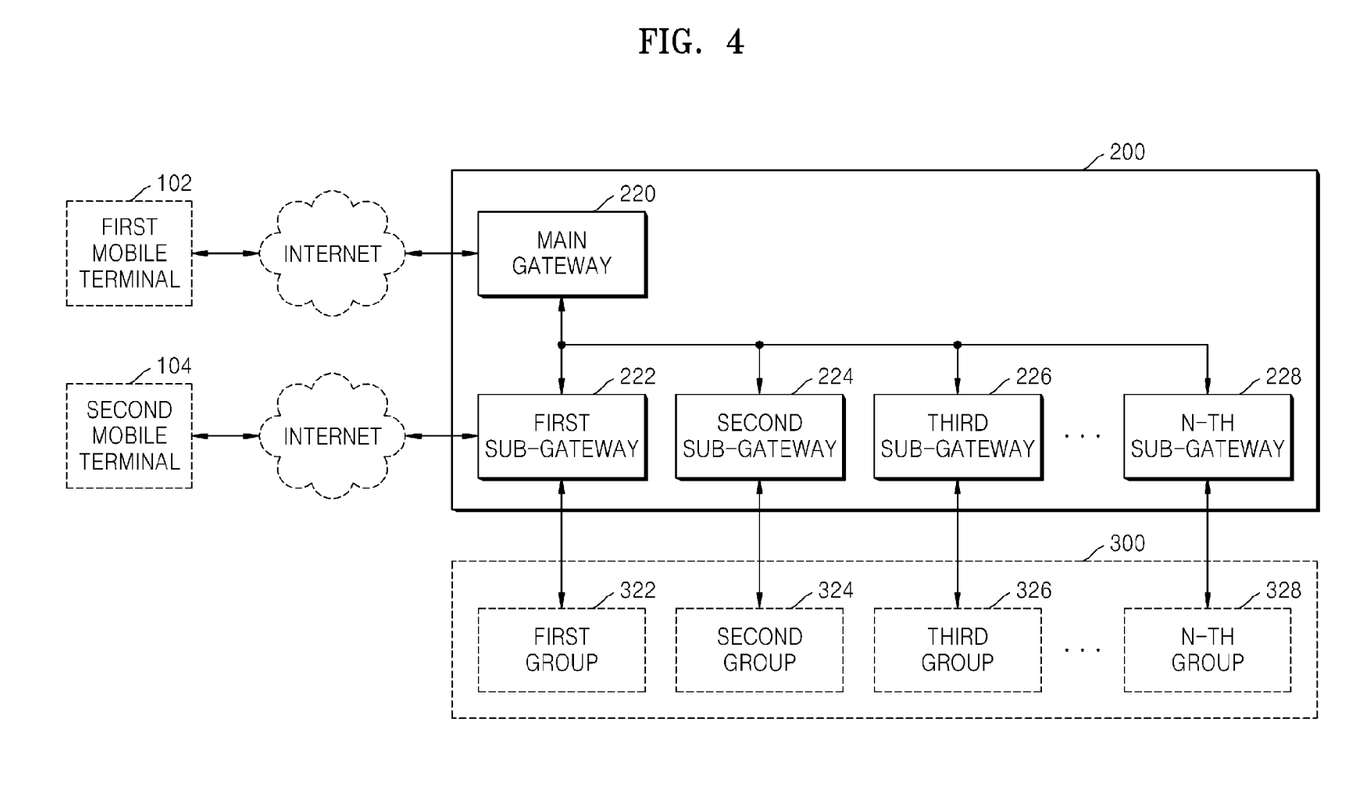
FIG. 4 illustrates a gateway illustrated in FIG. 1, according to another example of the present disclosure.

FIG. 4 illustrates the gateway 200 illustrated in FIG. 1, according to another example of the present disclosure. Referring to FIG. 4, a system for controlling a plurality of street lamps may include a first mobile terminal 102, a second mobile terminal 104, and a gateway 200. The gateway 200 according to an example of the present disclosure may include a main gateway 220, a first sub-gateway 222, a second sub-gateway 224, a third sub-gateway 226, . . . , and an N-th sub-gateway 228. The gateway 200 may relay data transmission and reception between the mobile terminals 102 and 104, and the plurality of street lamps 300. In more detail, the plurality of street lamps 300 may be grouped into a plurality of groups, such as a first group 322, a second group 324, a third group 326, . . . , and an N-th group 328 according to their positions, and the plurality of sub-gateways 222, 224, 226, and 228 may monitor the street lamps included in each of the plurality of groups 322, 324, 326, . . . , and 328.

The first mobile terminal 102 and the second mobile terminal 104 may perform the same operations as those performed by the mobile terminals 100 illustrated in FIGS. 1 and 2, and thus any redundant description thereof will be omitted.

In addition, the gateway 200 shown in FIG. 4 is an example of the gateway 200 shown in FIG. 1. Thus, the gateway 200 according to an example of the present disclosure is not limited to the elements shown in FIG. 4. In addition, the description of FIG. 1 may be applied to the gateway 200 shown in FIG. 4 and thus, any redundant description thereof will be omitted.

The gateway 200 shown in FIG. 4 may be the same as the gateway 200 shown in FIG. 3 except for the first sub-gateway 222 directly connected to the Internet, and thus any redundant description thereof will be omitted. In addition, in FIG. 4, for convenience of explanation, only the first sub-gateway 222 is directly connected to the Internet. However, aspects of the present disclosure are not limited thereto, and the second sub-gateway 224 and the N-th sub-gateway 228 may be directly connected to the Internet.

As illustrated in FIG. 4, when the first sub-gateway 222 is directly connected to the Internet, the first sub-gateway 222 may limitedly function as the main gateway 220.

In more detail, the first mobile terminal 102 may be connected to the main gateway 220 via the Internet, and the second mobile terminal 104 may be connected to the first sub-gateway 222 via the Internet. In this case, when a predetermined event has occurred in the first street lamp, the first sub-gateway 222 may generate event information indicating that the predetermined event has occurred in the first street lamp and may transmit the generated event information directly to the second mobile terminal 104. In addition, aspects of the present disclosure are not limited thereto, and the first sub-gateway 222 may generate event information indicating that the predetermined event has occurred in the first street lamp and may transmit the generated event information to the first mobile terminal 102 via the main gateway 222.

In this way, when the second mobile terminal 104 for managing a partial area other than the first mobile terminal 102 for managing the entire system further exists, the first sub-gateway 222 may function as a main gateway to the second mobile terminal 104, and the sub-gateway 222 may function as a sub-gateway to the first mobile terminal 102.

In this way, as the first sub-gateway 222 is directly connected to the Internet, the first sub-gateway 222 functions as the main gateway 220. Thus, when an area to be controlled by the main gateway 220 is expanded, data may be prevented from being concentrated on the main gateway 220.

Figure 5:
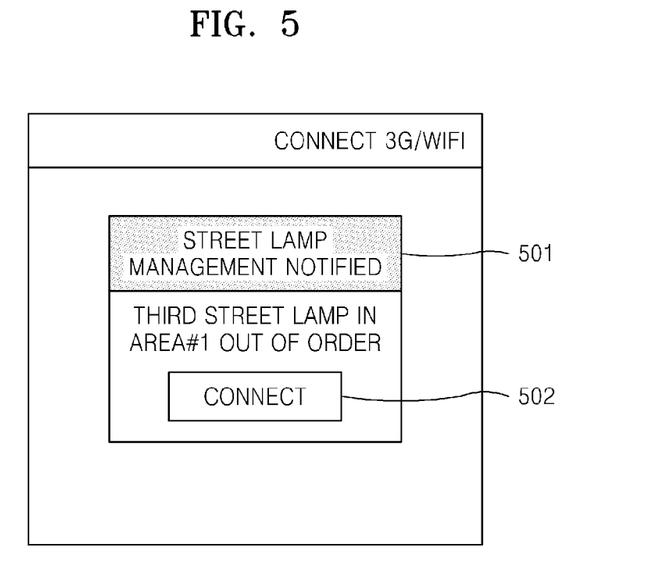
FIG. 5 illustrates a method of displaying notification information by using a user interface unit of the mobile terminal illustrated in FIG. 1, according to an example of the present disclosure.

FIG. 5 illustrates a method of displaying notification information 501 by using the user interface unit 120 of the mobile terminal 100 illustrated in FIG. 1, according to an example of the present disclosure. Referring to FIGS. 2 and 5, the user interface unit 120 may display the notification information 501, such as "street lamp management notified," on the mobile terminal 100. In this case, the notification information 501 may be displayed on a screen of the mobile terminal 100 as an example of the user interface unit 120.

The notification information 510 may include a phrase, such as "third street lamp in Area #1 out of order." In this case, "Area #1" may refer to an area corresponding to a group including a third street lamp among the plurality of street lamps 300.

When the third street lamp is out of order, a sub-gateway for monitoring the group including the third street lamp among a plurality of sub-gateways may generate event information regarding the third street lamp, and the generated event information may be transmitted to the mobile terminal 100 via the Internet in real-time.

Thus, the communication interface unit 110 of the mobile terminal 100 may receive the event information regarding the third street lamp in real-time, and the user interface unit 120 of the mobile terminal 100 may provide the notification information 501 indicating the event information regarding the third street lamp and/or indicating that the event information regarding the third street lamp was received, to the user of the mobile terminal 100 in real-time.

The notification information 501 may be a user interface (UI) implemented by performing the push function of the application installed in the mobile terminal 100. In addition, the user of the mobile terminal 100 may power on/off the push function according to setting of the application. Thus, when the push function is set in an ON state, the user may receive information regarding whether the plurality of street lamps 300 connected to the mobile terminal 100 is out of order, from the gateway 200 in real-time.

Additionally, the user may further input control information for controlling the third street lamp by selecting a connection button 502 included in the notification information 501. An exemplary UI to input the control information, when the connection button 502 included in the notification information 501 is selected by the user, is illustrated in FIG. 6.

Figure 6:
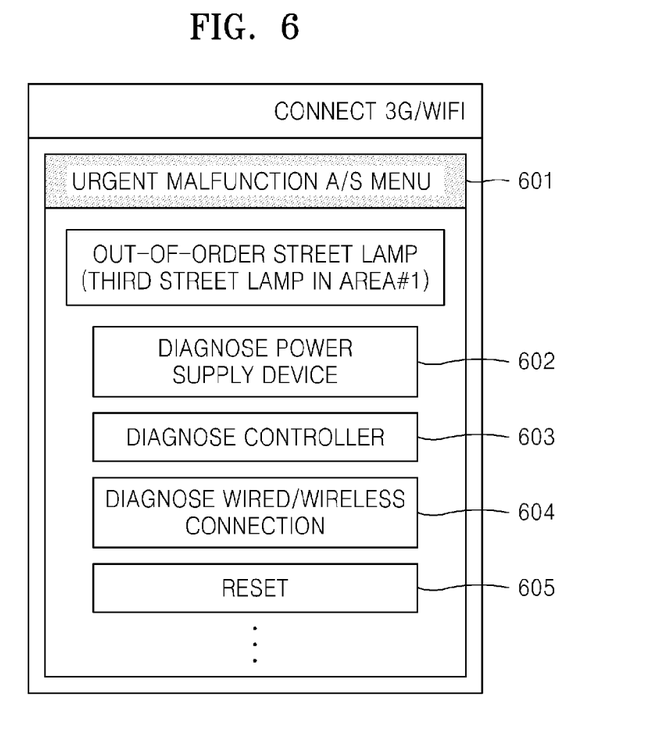
FIG. 6 illustrates a method of inputting control information by using a user interface unit of the mobile terminal illustrated in FIG. 1, according to an example of the present disclosure.

FIG. 6 illustrates a method of inputting control information by using the user interface unit 120 of the mobile terminal 100 illustrated in FIG. 1, according to an example of the present disclosure. Referring to FIGS. 2 and 6, the user interface unit 120 may display, on the mobile terminal 100, a menu 601 to which control information, such as "urgent malfunction after service (NS) menu," is to be input. In this case, the menu 601 may be displayed on a screen of the mobile terminal 100 as an example of the user interface unit 120.

Referring to FIG. 6, the menu 601 may include a power supply device diagnosing button 602 for diagnosing a power supply device of a street lamp, a controller diagnosing button 603 for diagnosing a controller of the street lamp, a wired/wireless connection diagnosing button 604 for diagnosing a wired/wireless connection status of the street lamp, and a reset button 605 for resetting the street lamp in a preset initial state, or the like. Thus, the user may input the control information for controlling the street lamp by selecting one from among a plurality of buttons included in the menu 601. However, aspects of the present disclosure are not limited thereto, and the control information may be directly input by the user to the user interface unit 120 according to an example of the present disclosure.

Thus, the user may conveniently input the control information for controlling the street lamp in which a predetermined event has occurred, from among the plurality of street lamps 300, by using the mobile terminal 100 according to an example of the present disclosure. A control instruction based on the input control information may be used in checking the status of the out-of-order street lamp or in urgently repairing the out-of-order street lamp as the street lamp, in which the predetermined event has occurred, is controlled using the gateway 200 in real-time.

Figure 7:
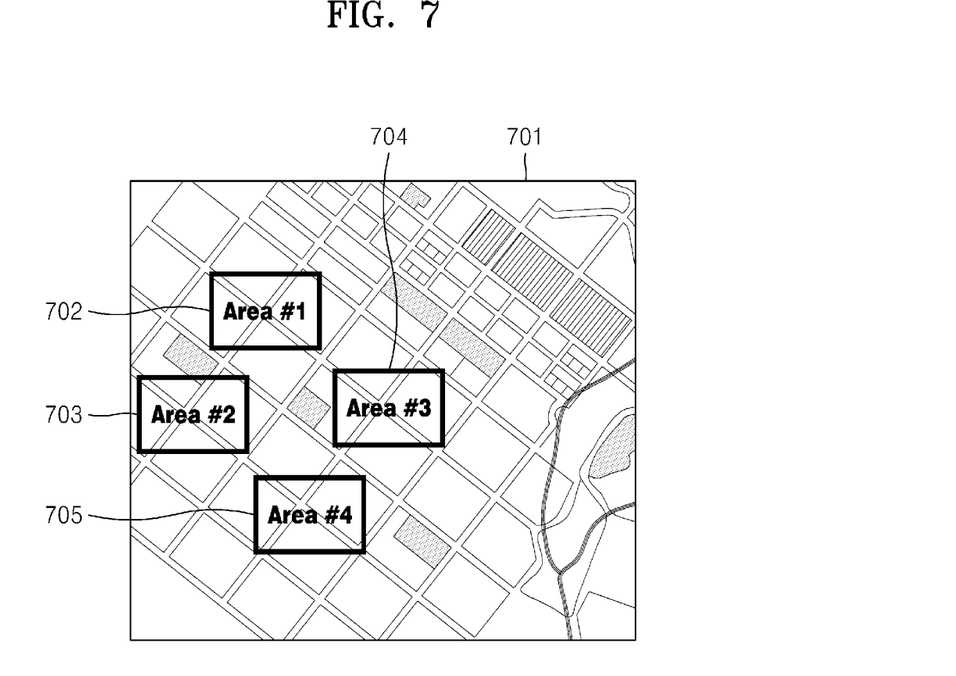
FIG. 7 illustrates a map displayed on the user interface unit of the mobile terminal illustrated in FIG. 1, according to an example of the present disclosure.

FIG. 7 illustrates a map 701 displayed on the user interface unit 120 of the mobile terminal 100 illustrated in FIG. 1, according to an example of the present disclosure. Referring to FIG. 7, a plurality of groups configured by grouping a plurality of street lamps 300 according to their positions are disposed in a first area 702, a second area 703, a third area 704, and a fourth area 705.

Referring to FIGS. 3 and 4, the first area 702 may represent positions of street lamps included in the first groups 312 and 322, and the second area 703 may represent positions of street lamps included in the second groups 314 and 324, and the third area 704 and the fourth area 705 may also be defined in this manner.

That is, the first area 702 may represent an area allocated to first sub-gateways 212 and 222, and the second area 703 may represent an area allocated to second sub-gateways 214 and 224, and the third area 704 and the fourth area 705 may also be defined in this manner.

In addition, the map 701 illustrated in FIG. 7 may be an UI implemented by executing an application installed in the mobile terminal 100. In this case, the map 701 may be embedded in the mobile terminal 100 or may be provided via the Internet.

Thus, the user may view status information regarding street lamps included in a selected area by selecting one from among the first area 702, the second area 703, the third area 704, and the fourth area 705 of the map 701 illustrated in FIG. 7. An exemplary UI to view status information regarding the first area 702, when the first area 702 is selected, is illustrated in FIG. 8.

Figure 8:
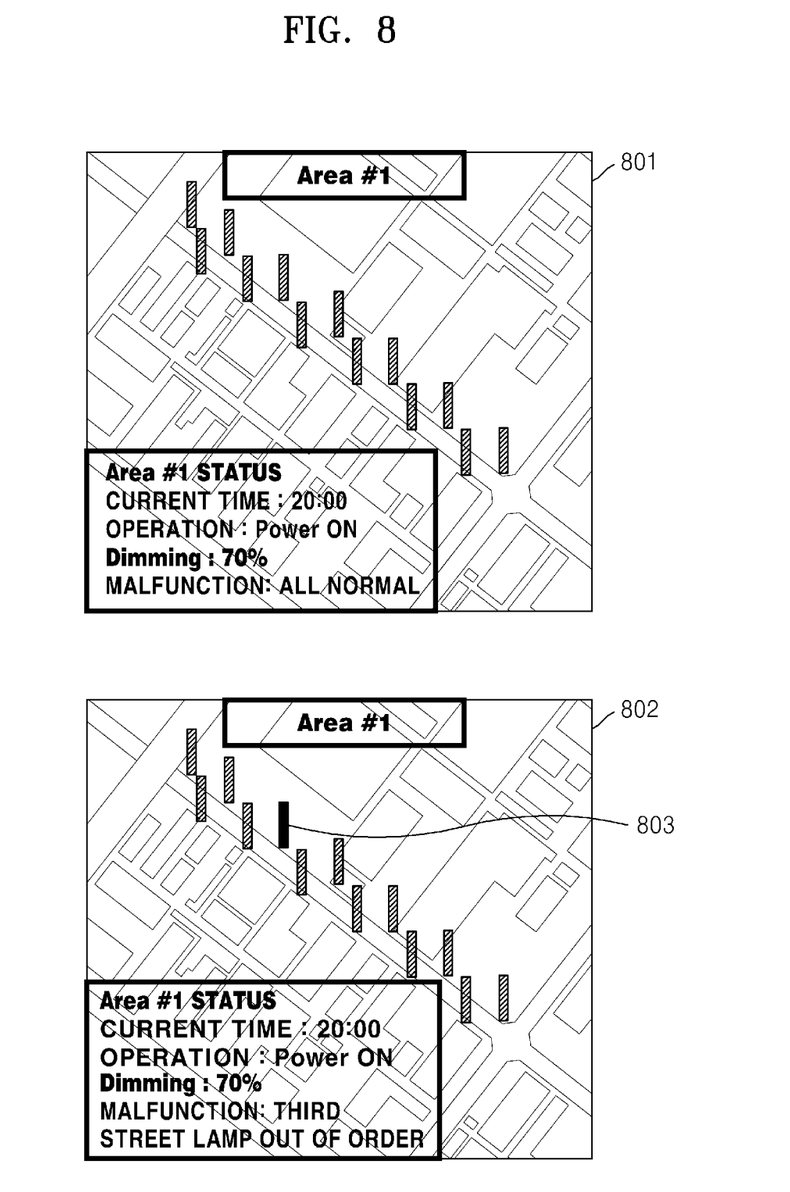
FIG. 8 illustrates a map displayed on the user interface unit of the mobile terminal illustrated in FIG. 1, according to another example of the present disclosure.

FIG. 8 illustrates a map displayed on the user interface unit 120 of the mobile terminal 100 illustrated in FIG. 1, according to another example of the present disclosure. Referring to FIG. 8, a first UI 801 and a second UI 802 implemented to view status information regarding a first area are illustrated.

Referring to the first UI 801, the user interface unit 120 (see FIG. 2) may display status information regarding the first area selected by the user. The first UI 801 may include a map corresponding to the first area and information regarding positions of the street lamps of a first group mapped to a map area corresponding to the first area. Additionally, the first UI 801 may further display status information including existence of an operation, a degree of dimming, existence of a malfunction of the street lamps included in the first group corresponding to the first area, or the like.

Referring to the second UI 802 of FIG. 8, the user interface unit 120 may display status information regarding the first area selected by the user. In this case, when a predetermined event, such as a malfunction, or the like, occurs in a third street lamp 803, the user interface unit 120 may display status information indicating that the malfunction has occurred in the third street lamp 803, and may show the third street lamp 803 in another color, as illustrated in the second UI 802 of FIG. 8, so that the user may easily recognize that the predetermined event occurred in the third street lamp 803.

Additionally, the user may control a plurality of street lamps together, which are included in the first group corresponding to the first area. For example, the user may control existence of an operation and a degree of dimming of the street lamps together, included in the first group by referring to the status information of the first UI 801 or the second UI 802. In this case, the user interface unit 120 may further display a control menu for controlling existence of an operation and a degree of dimming of the street lamps together, included in the first group. In addition, the user interface unit 120 may perform all control methods of controlling the street lamps as well as controlling existence of an operation and a degree of dimming of the street lamps included in the first group.

Thus, the user may turn on or off the street lamps included in the first group simultaneously by using the user interface 120, or may adjust a degree of dimming simultaneously so that the plurality of street lamps may be conveniently managed under a user's control.

Figure 9:
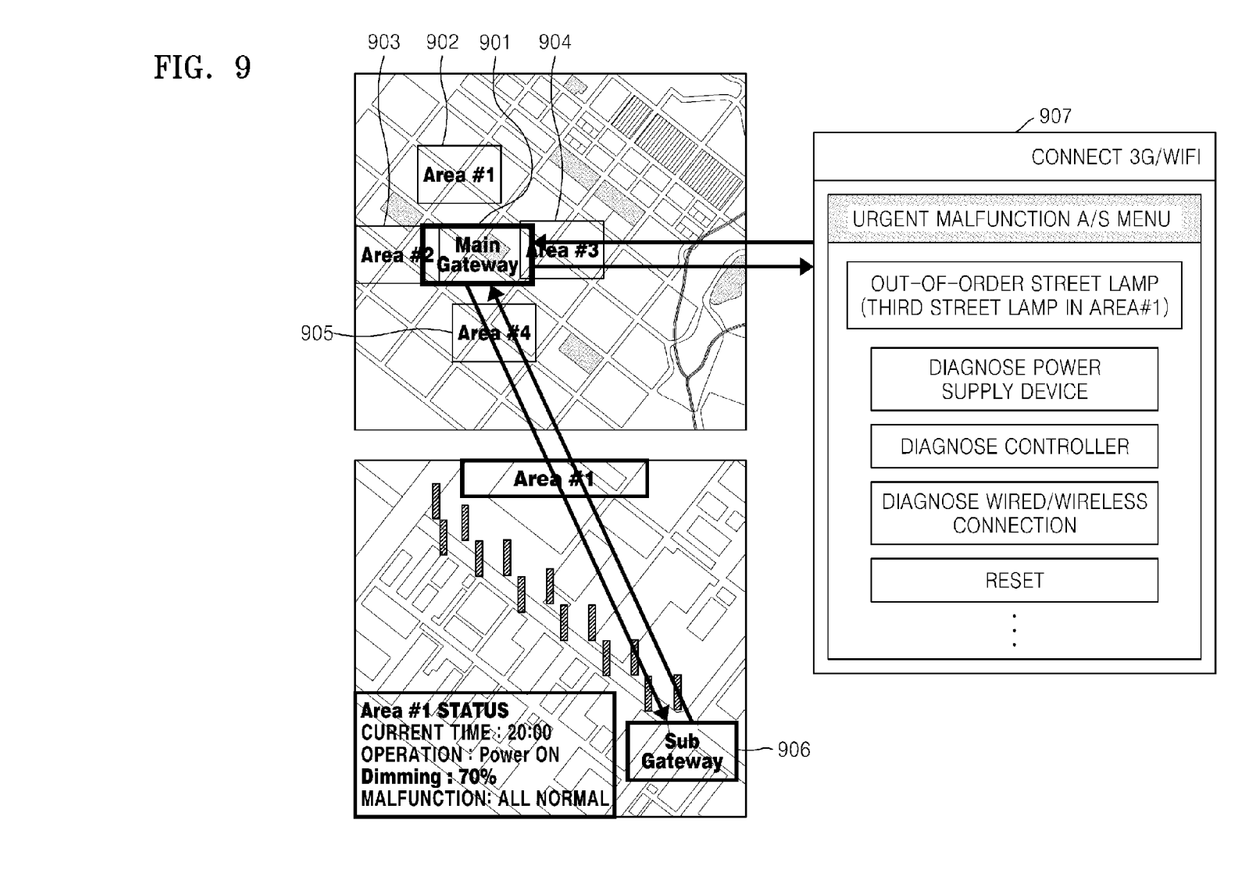
FIG. 9 illustrates a communication path between the mobile terminal and the gateway illustrated in FIG. 1, according to an example of the present disclosure.

FIG. 9 illustrates a communication path between the mobile terminal 100 and the gateway 200 illustrated in FIG. 1, according to an example of the present disclosure. Referring to FIG. 9, the main gateway 901 may be installed in a district in which street lamps included in a first area 902, a second area 903, a third area 904, and a fourth area 905 to be monitored by a plurality of sub-gateways, may be connected to each other. In addition, as an example of the first area 902, a first sub-gateway 906 for monitoring the first area 902 may be installed in a district in which street lamps included in first groups corresponding to the first area 902 may be connected to each other and may be managed.

The mobile terminal 100 connected to the main gateway 901 via the Internet may control street lamps included in each of the first area 902, the second area 903, the third area 904, and the fourth area 905 by using a control menu 907.

In addition, when a global positioning system (GPS) function, or the like is provided to the mobile terminal 100 according to an example of the present disclosure, status information regarding areas adjacent to the mobile terminal 100 or regarding street lamps located adjacent to the mobile terminal 100 may be checked.

Thus, the user of the mobile terminal 100 may control the plurality of street lamps included in the first area 902, the second area 903, the third area 904, and the fourth area 905 under management of the mobile terminal 100.

Figure 10:
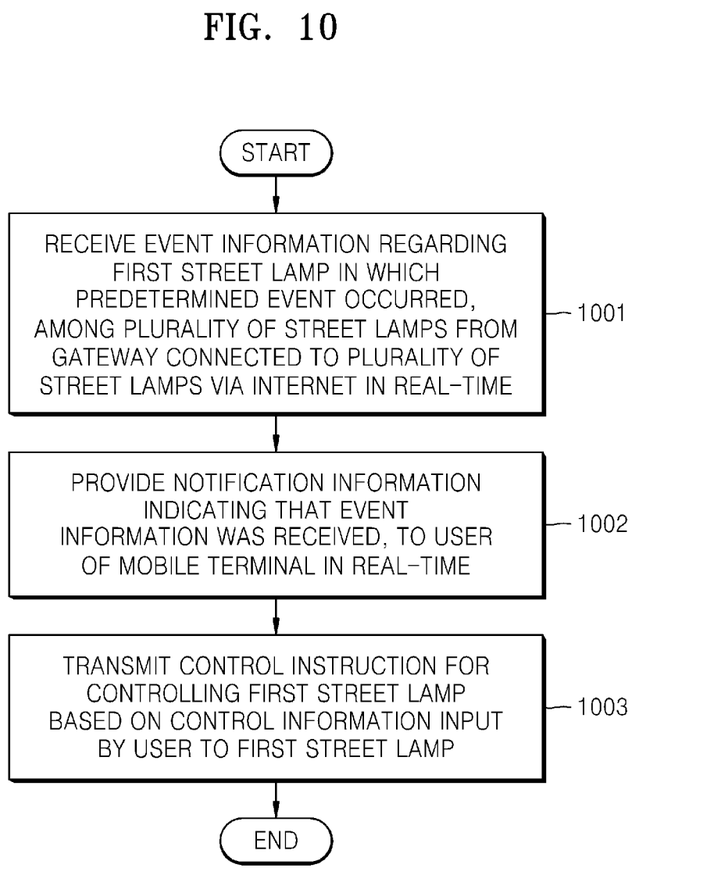
FIG. 10 is a flowchart illustrating a method of controlling a plurality of street lamps by using the mobile terminal illustrated in FIG. 1, according to an example of the present disclosure

FIG. 10 is a flowchart illustrating a method of controlling a plurality of street lamps 300 by using the mobile terminal 100 illustrated in FIG. 1, according to an example of the present disclosure. Referring to FIG. 10, the method of controlling the plurality of street lamps 300 includes operations or steps to be sequentially performed by the mobile terminal 100 and the gateway 200 illustrated in FIGS. 1 through 4. Thus, although omitted below, the description of the mobile terminal 100 and the gateway 200, as illustrated in FIGS. 1 through 4, may also be applied to the method of controlling the plurality of street lamps 300 as illustrated in FIG. 10.

In operation or step 1001, the communication interface unit 110 may receive event information regarding a first street lamp in which a predetermined event occurred, from among the plurality of street lamps 300, from the gateway 200 connected to the plurality of street lamps 300 via the Internet in real-time.

In operation or step 1002, the user interface unit 120 may provide notification information indicating the event information and/or indicating that the event information was received, to a user of the mobile terminal 100 in real-time.

In operation or step 1003, the communication interface unit 110 may transmit, to the first street lamp, a control instruction for controlling the first street lamp based on control information input by the user.

Thus, the user may perform real-time control on a street lamp, in which a predetermined event, such as a malfunction, or the like, has occurred, by using the mobile terminal 100.

Figure 11:
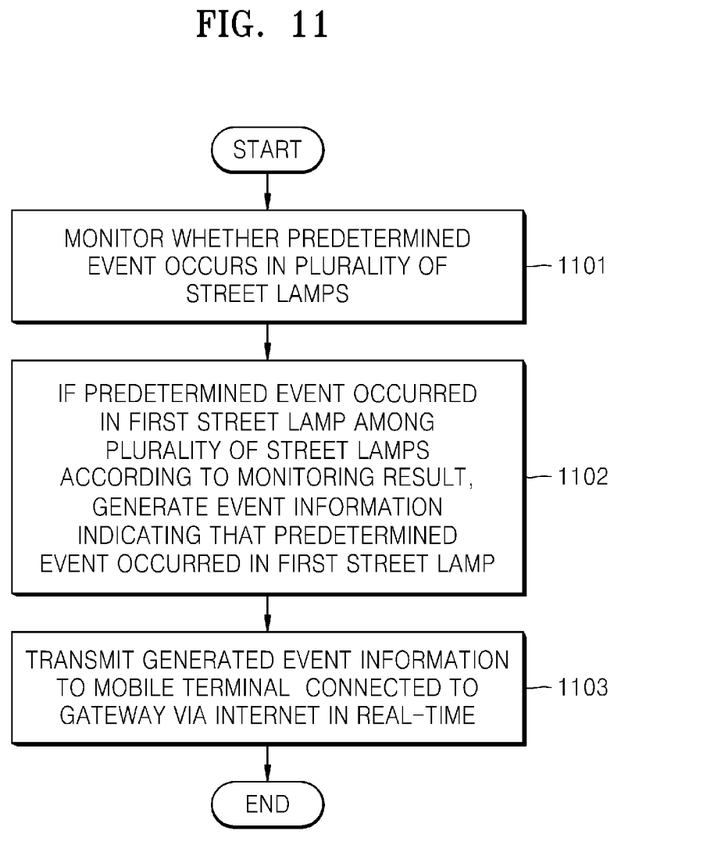
FIG. 11 is a flowchart illustrating a method of controlling a plurality of street lamps by using the gateway illustrated in FIG. 1, according to another example of the present disclosure.

FIG. 11 is a flowchart illustrating a method of controlling a plurality of street lamps 300 by using the gateway 200 illustrated in FIG. 1, according to another example of the present disclosure. Referring to FIG. 11, the method of controlling the plurality of street lamps 300 includes operations or steps to be sequentially performed by the mobile terminal 100 and the gateway 200, as illustrated in FIGS. 1 through 4. Thus, although omitted below, the description of the mobile terminal 100 and the gateway 200 illustrated in FIGS. 1 through 4 may also be applied to the method of controlling the plurality of street lamps 300, as illustrated in FIG. 11.

In operation or step 1101, a plurality of sub-gateways 212, 214, 216, and 218, or 222, 224, and 228 may monitor whether a predetermined event occurs in the plurality of street lamps 300. The plurality of sub-gateways 212, 214, 216, and 218, or 222, 224, 226, and 228 also may determine whether a predetermined event occurs in the plurality of street lamps 300.

In operation or step 1102, if it is determined that the predetermined event has occurred in a first street lamp among the plurality of street lamps 300, according to a monitoring result, the first sub-gateway 212 or 222 may generate event information indicating that the predetermined event has occurred in the first street lamp.

In operation or step 1103, the first sub-gateway 212 or 222 may transmit the generated event information to the mobile terminal 100 connected to the gateway 200 via the Internet in real-time. In this case, the mobile terminal 100 connected to the gateway 200 may be the mobile terminal 100 connected to the first sub-gateway 212 or 222, or the mobile terminal 100 connected to the main gateway 210 or 220 for connecting the plurality of sub-gateways 212, 214, 216, and 218, or 222, 224, 226, and 228.

Thus, the user may perform real-time control on a street lamp in which a predetermined event, such as a malfunction, or the like, has occurred, by using the gateway 200.

The method can be written as computer programs and can be implemented in general-use digital computers that execute the programs using a computer readable recording medium. In addition, the structure of data used in the method can be written on a computer readable recording medium by using several units. Examples of the computer readable recording medium include magnetic storage media (e.g., ROM, RAM, USB, floppy disks, hard disks, etc.), optical recording media (e.g., CD-ROMs, or DVDs), PC interface (e.g., PCI, PCI-express, WiFi, etc.), etc.

As described above, the user may receive event information regarding a street lamp in which a predetermined event has occurred, among a plurality of street lamps, via the Internet in real-time so that a real-time control operation may be conveniently performed on the street lamp in which the predetermined event has occurred.

Although examples of the present disclosure have been shown and described, it will be appreciated by those skilled in the art that changes may be made without departing from the principles and spirit of the present disclosure, the scope of which is defined in the appended claims.

What is claimed is:

1. A method of controlling a plurality of street lamps with a mobile terminal, the method comprising steps of:
   receiving event information regarding a first street lamp, in which a predetermined event has occurred among the plurality of street lamps, from a gateway connected to the plurality of street lamps via an Internet in real-time;
   providing notification information indicating that the event information has been received, to a user of the mobile terminal in real-time; and
   transmitting, to the first street lamp, a control instruction for controlling the first street lamp based on control information input by the user,
   wherein the step of receiving the event information comprises: receiving event information generated by a first sub-gateway for monitoring the first street lamp, among a plurality of sub-gateways, each of the plurality of sub-gateways being configured to monitor street lamps included in each of a plurality of groups, the plurality of groups being configured by grouping the plurality of street lamps according to positions of the plurality of street lamps.

2. The method of claim 1, wherein the event information regarding the first street lamp includes information regarding a position of the first street lamp and information regarding a malfunction that has occurred in the first street lamp.

3. The method of claim 1, wherein the step of providing the notification information comprises:
   providing the notification information in real-time by performing at least one of a display operation of displaying the notification information and a sound outputting operation of outputting a sound corresponding to the notification information by using a push function.

4. The method of claim 1, wherein the control instruction includes an instruction for performing at least one of:
an operation of diagnosing the first street lamp,
an operation of turning on/off the first street lamp,
an operation of dimming the first street lamp, and
an operation of resetting the first street lamp to a preset initial state.

5. The method of claim 4, wherein the operation of diagnosing the first street lamp includes at least one of:
an operation of diagnosing a power supply device of the first street lamp,
an operation of diagnosing a controller of the first street lamp, and
an operation of diagnosing a wired/wireless connection state of the first street lamp.

6. The method of claim 1, wherein the step of receiving the event information comprises:
receiving event information generated by the first sub-gateway from a main gateway connected to the plurality of sub-gateways.

7. The method of claim 1, wherein the step of transmitting the control instruction comprises:
in order to control street lamps included in a second group monitored by a second sub-gateway among the plurality of sub-gateways, transmitting the control instruction based on the control information input by the user to the street lamps included in the second group via the second sub-gateway.

8. The method of claim 1, further comprising the step of:
according to the user's manipulation, performing a display operation of displaying a map to which information regarding a position of at least one street lamp among the plurality of street lamps is mapped.

9. The method of claim 8, wherein the step of performing the display operation comprises:
performing the display operation by mapping the information regarding the position of the at least one street lamp among the plurality of street lamps to one of a map embedded in the mobile terminal and a map provided via the Internet.

10. The method of claim 1, further comprising the steps of:
receiving an application for controlling a particular street lamp from an external device outside the mobile terminal; and
executing the received application to perform the receiving of the event information, the providing of the notification information, and the transmitting of the control instruction.

11. A method of controlling a plurality of street lamps with a gateway, the method comprising steps of:
monitoring whether a predetermined event occurs in the plurality of street lamps;
determining, according to a monitoring result, whether a predetermined event has occurred in a first street lamp among the plurality of street lamps;
when it is determined that the predetermined event has occurred in the first street lamp, generating event information indicating that the predetermined event has occurred in the first street lamp; and
transmitting the generated event information to a mobile terminal connected to the gateway via an Internet in real-time,
wherein:

the step of monitoring whether the predetermined event occurs in the plurality of street lamps comprises: monitoring whether the predetermined event occurs in the plurality of street lamps by using a plurality of sub-gateways, each of the plurality of sub-gateways being configured to monitor street lamps included in each of a plurality of groups, the plurality of groups being configured by grouping the plurality of street lamps according to positions of the plurality of street lamps,
the step of generating the event information comprises: generating the event information in a first sub-gateway for monitoring the first street lamp, among the plurality of sub-gateways, and
the step of transmitting the generated event information comprises: transmitting the event information generated by the first sub-gateway to a particular mobile terminal connected to the first sub-gateway.

12. The method of claim 11, wherein
the step of transmitting the generated event information further comprises: transmitting the event information generated by the first sub-gateway to a main gateway connected to the plurality of sub-gateways and transmitting the event information transmitted from the first sub-gateway to the mobile terminal by using the main gateway.

13. The method of claim 11, wherein the event information regarding the first street lamp includes information regarding a position of the first street lamp and information regarding a malfunction that has occurred in the first street lamp.

14. A non-transitory computer readable recording medium, having recorded thereon a program for executing the method of claim 1.

15. A non-transitory computer readable recording medium, having recorded thereon a program for executing the method of claim 11.

16. An apparatus for controlling a plurality of street lamps, comprising:
a mobile terminal; and
a gateway including a plurality of sub-gateways each being configured to monitor street lamps included in each of a plurality of groups, the plurality of groups being configured by grouping the plurality of street lamps according to positions of the plurality of street lamps, and the gate way configured to:
monitor whether a predetermined event occurs in the plurality of street lamps,
generate event information indicating that the predetermined event occurred in a first street lamp among the plurality of street lamps, and
transmit the generated event information to the mobile terminal, through a first sub-gateway for monitoring the first street lamp, among the plurality of sub-gateways.

17. The apparatus of claim 16, wherein:
the mobile terminal includes:
a communication interface unit configured to receive the event information from the gateway via an Internet in real-time; and
a user interface unit configured to provide notification information indicating that the event information has been received, to a user in real-time, wherein the communication interface unit is configured to transmit, to the first street lamp, a control instruction for controlling the first street lamp based on control information input by the user.

* * * * *